United States Patent
Kallesøe et al.

(10) Patent No.: US 10,690,423 B2
(45) Date of Patent: Jun. 23, 2020

(54) METHOD FOR A HEAT TRANSFER SYSTEM AND HEAT TRANSFER SYSTEM

(71) Applicant: GRUNDFOS HOLDING A/S, Bjerringbro (DK)

(72) Inventors: Carsten Skovmose Kallesøe, Viborg (DK); Brian Kongsgaard Nielsen, Viborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 1 day.

(21) Appl. No.: 14/546,305

(22) Filed: Nov. 18, 2014

(65) Prior Publication Data

US 2015/0136377 A1    May 21, 2015

(30) Foreign Application Priority Data

Nov. 19, 2013    (EP) .................................... 13193555

(51) Int. Cl.
| | |
|---|---|
| *F28F 27/02* | (2006.01) |
| *F24D 19/10* | (2006.01) |
| *G05D 23/19* | (2006.01) |
| *G05D 23/13* | (2006.01) |
| *F24D 5/04* | (2006.01) |
| *F24F 3/08* | (2006.01) |

(52) U.S. Cl.
CPC ................ *F28F 27/02* (2013.01); *F24D 5/04* (2013.01); *F24D 19/1006* (2013.01); *F24D 19/1084* (2013.01); *F24F 3/08* (2013.01); *G05D 23/1393* (2013.01); *G05D 23/1919* (2013.01); *G05D 23/1931* (2013.01)

(58) Field of Classification Search
CPC ......... F28F 27/02; F28F 27/00; F28F 2250/06
USPC .................................................. 165/297, 298
See application file for complete search history.

(56) References Cited

U.S. PATENT DOCUMENTS

| 3,608,818 A * | 9/1971 | Von Fellenberg ........................... F24D 19/1006 165/279 |
|---|---|---|
| 4,285,333 A * | 8/1981 | Tanaka ...................... F24J 2/402 126/586 |
| 2003/0172882 A1* | 9/2003 | Nakano ..................... F01P 5/14 123/41.1 |

FOREIGN PATENT DOCUMENTS

| CN | 1217051 A | 5/1999 |
|---|---|---|
| EP | 0 197 836 A1 | 10/1986 |
| GB | 2 068 601 A | 8/1981 |
| JP | H0395363 | * 4/1991 |
| WO | 97/36138 A1 | 10/1997 |
| WO | 02/090832 A1 | 11/2001 |

OTHER PUBLICATIONS

Katou, JPH0395363TRANS (English Translation), 1991.*

* cited by examiner

*Primary Examiner* — Eric S Ruppert
(74) *Attorney, Agent, or Firm* — McGlew and Tuttle, P.C.

(57) ABSTRACT

A control method for a heat transfer system, wherein the heat transfer system comprises a supply conduit (12), at least one load circuit (2) and a heat transfer device (6; 28) between the supply conduit and the at least one load circuit, wherein a supply flow (qS) in the supply conduit (12) is detected on the basis of a desired entry-side load temperature (Tref), of an actual entry-side load temperature (TL) which is detected in the load circuit (2) and of a load flow (qL) in the load circuit (2), as well to as a heat transfer system, in which such a control method is applied.

20 Claims, 9 Drawing Sheets

METHOD FOR A HEAT TRANSFER SYSTEM AND HEAT TRANSFER SYSTEM

CROSS REFERENCE TO RELATED APPLICATIONS

This application claims the benefit of priority under 35 U.S.C. § 119 of European Patent Application EP 13 193 555.3 filed Nov. 19, 2013, the entire contents of which are incorporated herein by reference.

FIELD OF THE INVENTION

The invention relates to a control method for a heat transfer system, as well as to such a heat transfer system.

BACKGROUND OF THE INVENTION

Heat transfer systems are known, such as mixing circuits (mixing loops) in heating installations, with which a part of the return flow from a load circuit is admixed again to the feed of the load circuit, in order to reduce the temperature in the feed. As a rule, a valve and a pump are provided for this, wherein the valve, via which the admixing is regulated (closed-loop controlled), is regulated in dependence on the temperature in the feed to the load circuit. Independently of this, as a rule the pump in the load circuit is regulated with regard to its speed in a pressure-dependent manner. Moreover, it is also known to apply heat transfer systems with heat exchangers in heating installations, wherein one side of the heat exchanger is connected to a supply conduit for heating medium and the other side of the heat exchanger is connected to a load circuit. As a rule, a delivery pump is provided in the load circuit, and a valve in the supply conduit, via which valve the quantity of the fed heating medium is regulated depending on the temperature in the load circuit. Here too, the temperature regulation takes place independently of the pressure regulation, via the speed of the pump. The disadvantage of these systems is the fact that this can lead to sluggishness at high loads as well as to an oscillation of the regulation at part loads.

SUMMARY OF THE INVENTION

It is an object of the invention, to improve the control of a heat transfer system to the extent that it permits an optimal regulation in all operating conditions.

According to the invention, a control method is provided for a heat transfer system comprising a supply conduit, at least one load circuit and a heat transfer device between the supply conduit and the at least one load circuit. The control method comprises setting a supply flow in the supply conduit on the basis of: a desired entry-side load temperature; an actual entry-side load temperature which is detected in the load circuit; and a load flow in the load circuit.

According to another aspect of the invention, a heat transfer system is provided comprising a supply conduit, at least one load circuit, a heat transfer device between the supply conduit and the at least one load circuit and a supply flow setting device which sets the supply flow. The supply flow setting device comprises at least one control device configured to carry out a control method comprising setting a supply flow in the supply conduit on the basis of: a desired entry-side load temperature; an actual entry-side load temperature which is detected in the load circuit; and a load flow in the load circuit.

Preferred embodiments are to be deduced from the claims, the subsequent description as well as from the attached drawings, wherein it is to be understood that individual, disclosed features can be realized individually as well as in combination.

The control method according to the invention is envisaged for a heat transfer system, for example a mixing circuit in an air-conditioning installation or heating insulation or for a heating circuit or cooling circuit with a heat exchanger arranged therein. With such systems, heat is transferred from a supply conduit or a supply circuit via the mixer or the heat exchanger onto a load circuit or this is cooled. With a heat exchanger thereby, the supply circuit flows through one side of the heat exchanger, whilst the load circuit flows through a second flow path or the other side of the heat exchanger. With a mixing circuit, a supply flow (supply volume rate of flow) controlled by a valve or a pump flows from the supply conduit into the load circuit, and a part of the flow in the load circuit is released by way of admixing a part of the return flow out of the load circuit into the entry side of the load circuit. The entry-side temperature of the load circuit can be set by way of this admixing.

Common to heat transfer systems, for which the control method according to the invention is envisaged, is that the heat transfer system comprises at least one supply conduit or a supply circuit with at least one load circuit and with a heat transfer device between the supply conduit and the at least one load circuit. The heat transfer device thereby in a first embodiment comprises at least one heat exchanger with a first flow path connected to the supply conduit and with a second flow path connected to the at least one load circuit. In a second possible embodiment, the heat transfer device can be designed as a mixing device and comprise at least one mixing conduit which connects an outlet of the at least one load circuit and an inlet or entry of the load circuit to one another. Simultaneously, the entry of the load circuit is connected to the mentioned supply conduit. A part flow from the return flow or the outlet of the load circuit is admixed via the mixing conduit to the supply flow from the supply conduit, in order, as the case may be, to set, e.g. to reduce the temperature of the supply flow at the entry side of the load circuit. The setting of the temperature is thereby preferably effected via a valve.

It is to be understood that the heat transfer device according to the invention can be used for a heating system as well as for a cooling system. In a heating system heated fluid is supplied to the load circuit, while in a cooling system cooled fluid is supplied to the load circuit. With the use of a mixing device, the entry-side temperature is lowered by the part flow admixed in a heating device from the return flow. In contrast, it is increased in a cooling system. If hereinafter, the invention is described with the example of a heating device, then it is to be understood that these futures can be accordingly applied also with a cooling device.

The control method according to the invention for a heat transfer system, as has been previously described, is designed such that a supply flow in the supply conduit is set, in particularly controlled or regulated, in a special manner. The setting of the supply flow according to the invention is effected at least based on a temperature signal and the flow in the load circuit, i.e. the load flow. The temperature signal is thereby either a desired entry-side load temperature and/or an actual, i.e. measured entry-side load temperature.

According to the invention, an integrated regulation is now provided, in contrast to the state of the art, in which it is known to provide two independent regulations, specifically on the one hand a speed regulation of the pump in dependence on the pressure or on a pressure difference and on the other hand additionally a regulation of the supply flow in dependence on the temperature at the entry side of the load circuit. With the regulation of the supply flow, not only the temperature, but simultaneously the prevailing load flow or load throughput is used as an input variable. According to the invention, the load temperature or a representative temperature signal or a representative temperature value as well as the flow in the load circuit are taken into account in the control or regulation circuit for the load temperature. An improved response behavior can be achieved by way of this, whilst avoiding undesired fluctuations and an undesired oscillation.

The supply flow or supply throughput is preferably set amid the use of a pump and/or valve, in particular a proportional valve. With the use of a pump, the flow can be changed by way of speed regulation of the pump. With the use of a valve, the flow is regulated or set by way of different valve settings or degrees of openings.

According to a preferred embodiment, the control behavior is designed such that the supply flow in the supply conduit or supply circuit is set additionally on the basis of an exit-side load temperature and/or on the basis of an entry-side supply temperature. For this, the respective temperature values of the fluid in the supply conduit, i.e. on the entry side in front of the heat transfer device, such as e.g. of a heat exchanger, or at the exit side of the load circuit are detected. Preferably, the supply flow is set amongst other things on the basis of a currently detected output-side load temperature and/or amongst other things on the basis of a currently detected entry-side supply temperature. A feedforward control of the supply flow can be effected by way of taking these values into account. Particularly preferably, a quotient of the load flow and the difference of the entry-side supply temperature and of the exit-side load temperature forms the basis of the setting of the supply flow, and this quotient represents a transfer factor of the load circuit. In a simplified control, one can also make do without the detection of the exit-side load temperature and/or the entry-side supply temperature, and the setting of the supply flow instead can be based on constants which are linked with the desired entry-side load temperature or with an actual entry-side load temperature or with the load flow, for setting the supply flow.

Preferably, the supply flow can thus additionally or alternatively be set on the basis of at least one constant which is preferably linked with the load flow and/or the desired entry-side load temperature. A particularly simple control can be formed with the help of such a constant, since the number of temperature values to be detected can be reduced. For example, with a feedforward control of the temperature, the desired entry-side load temperature can be summed with a constant, in order to set the supply flow on the basis of this signal and whilst taking the load flow into account. For this, the supply flow can for example be multiplied by a constant.

Particularly preferably, the load flow $q_S$ is determined according to the following equation:

$$q_S = \frac{q_L}{T_S - T_{RS}} \cdot V$$

wherein
$q_S$ is the supply flow,
$q_L$ the load flow,
$T_S$ the entry-side supply temperature,
$T_{RS}$ the exit-side supply temperature and
V a control signal.

The quotient $$\frac{q_L}{T_S - T_{RS}}$$

thereby forms a transfer factor of the heat transfer device. With regard to the temperature value $T_{RS}$, it is the case of the temperature at the exit side of a first flow path of the heat exchanger, through which flow path the supply circuit is led. In the case that the heat transfer device is a mixing circuit or comprises a mixing conduit, with regard to the temperature value $T_{RS}$ it is simultaneously the case of the exit-side temperature of the load circuit. This in this case is the same as the exit-side temperature of the supply circuit or of the supply conduit. The described control signal V can be the output signal of a regulator (closed-loop controller) or be determined according to the equation: $V=T_{ref}-T_R$, wherein $T_{ref}$ is the desired entry-side load temperature and $T_R$ in the case of a mixing circuit is the exit-side supply and load temperature $T_{RS}$. The control signal V can be formed from the output signal of a controller and the above equation, for example as a sum of the two sizes. In the case that the heat transfer device is a heat exchanger, with regard to the temperature value $T_R$ it is the case of the temperature $T_{RL}$ which prevails at the exit side of the load circuit, i.e. at the entry side of the second flow path of the heat exchanger, through which the load circuit flows. For the case that with regard to the heat transfer device it is the case of mixing circuit with a mixing conduit, the exit side load temperature is equal to the temperature which prevails in the mixing conduit. This is the temperature at the exit side of the load circuit which also corresponds to the temperature $T_{RS}$ at the exit side of the supply conduit or of the supply circuit. The difference $(T_{ref}-T_R)$ is a temperature feedforward or feedback. Thus, a feedforward regulation or a feedforward control of the supply flow whilst taking the load flow into account is thus possible on the basis of the thus detected given values.

In the case that a pump is applied for producing or setting the supply flow, i.e. the supply flow is set by a pump, preferably the speed n of the pump is determined on the basis of the following equation:

$$n = \frac{q_S}{K_{qn}}$$

wherein
$q_S$ is the supply flow and
$k_{qn}$ is a time-dependent signal which depends on the flow resistance in the supply conduit.

This means that the supply flow $q_S$ is determined in the previously described manner and subsequently divided by the factor $K_{qn}$, by way of which the hydraulic conditions in the supply conduit are taken into account. Thereby the factor $K_{qn}$ is >0. This means that a desired speed which is proportional to the desired supply flow can be set for the pump supply conduit by way of the control method according to the invention.

According to a further preferred embodiment, a differential pressure in particular across which is to say over the pump or across the valve can be taken into account for determining the speed of the pump, via which the supply flow is produced or set, or for determining an opening degree of the valve, via which the supply flow is set. Instead of the differential pressure across the pump or across the valve, a differential pressure between the entry side and the exit side of the supply conduit or of the supply circuit could also be taken into account. Thus, the flow through a valve for setting the supply flow is dependent on the opening position of the valve and the differential pressure. In the case of a linear valve, the supply flow results as an analytical function which is dependent on the opening position and the differential pressure. In the case of a non-linear valve, a characteristic field can be determined by way of measurements and this represents the dependence of the valve opening position on the delivery flow and on the differential pressure. Such a characteristic field can be stored and be used for setting the opening position of the valve on the basis of the supply flow determined in the described manner, and of a measured differential pressure.

Instead of directly producing a control signal proportional to the valve opening degree or a control signal proportional to the pump speed, in the control device which implements the described control method, also only a signal proportional to the delivery flow can be produced, and this signal then led to a flow regulator as an input variable for the regulation of the supply flow. Such a flow regulator can be integrated with the control device into a common electronic control device.

According to a further preferred embodiment, an addition regulation of the entry-side load temperature can be effected. This means that amid the detection of the actual, entry-side load temperature, this is regulated which is to say closed-loop controlled to a predefined setpoint, specifically the desired entry-side load temperature.

According to a further preferred embodiment of the control method according to the invention, on setting the supply flow, additionally a transfer delay between a measurement point of the entry-side load temperature and the heat transfer device is taken into account by way of at least one constant and/or a function dependent on the load flow. This is advantageous, if in the heat transfer system, a greater distance exists between the heat transfer device and the point, at which the entry-side load temperature is measured. In such a heat transfer system, a change of the supply flow cannot be detected by way of the entry-side temperature until the fluid set in its temperature in the heat transfer device, in the load circuit has run through the distance between the heat transfer device and the point of the detection of the entry-side load temperature. Thereby, the smaller the load flow or the flow speed in the load circuit, the longer it lasts until the fluid has traveled this section and the delay increases accordingly. This phenomenon is called variable transport delay. In order to avoid undesired oscillations or fluctuations in the regulation or control, suitable constants or factions can be introduced for taking this delay into account. This applies to the case that the heat transfer device is a heat exchanger as well as to the case that a mixing circuit is used as a heat transfer device.

With a further preferred embodiment, the load flow in the load circuit can be determined via a load pump. If a load pump for producing the load flow is arranged in the load circuit, then the flow corresponding to the load flow can be determined from characteristic values of the pump, in particular from the speed and power and/or the differential pressure. Thus, one can make do without a separate flow sensor for determining the load flow. Alternatively however, one could also provide a flow sensor for detecting the load flow.

Apart from the previously described control method, the subject matter of the invention is a heat transfer system in which such a control method is applied. This heat transfer system comprise a supply circuit or a supply conduit, at least one load circuit as well as a heat transfer device between the supply conduit and the at least one load circuit. The heat transfer device, as described above, can comprise at least one heat exchanger which has a first flow path which is connected to the supply conduit or through which the supply circuit runs. Moreover, the heat exchanger comprises a second flow path which is connected to the at least one load circuit. I.e. the load circuit runs through the second flow path. Thus heat can be transferred from the supply circuit or the fluid in the supply conduit onto the fluid in the load circuit, or a fluid in the load circuit can be cooled in the case of a cooling device. Alternatively, the heat transfer device can be designed as a mixing device and comprising a mixing conduit connecting the exit side of the at least one load circuit to the entry side of the load circuit. Simultaneously thereby, the entry side of the load circuit is connected to the supply conduit, so that fluid from the return or the exit side of the load circuit can be admixed to the fluid led from the supply conduit, in order e.g. to reduce the temperature of the fluid in the supply conduit at the entry side of the load circuit. The fluid flows from the supply conduit and from the mixing conduit can be set via at least one valve.

Moreover, the heat transfer system according to the invention comprises at least one supply flow setting device, via which the supply flow can be set or regulated. The supply flow setting device according to the invention comprises a control device which is designed such that it can carry out a method according to the preceding description, in order via the supply flow setting device, to set or to regulate the supply flow. The supply flow setting device can preferably comprise a pump, whose speed is set by the control device. Alternatively or additionally, the supply flow setting device can comprise a valve whose opening or degree of opening is set by the control device.

Further preferably, a sensor device for detecting an entry-side load temperature of the load circuit, and a sensor device for detecting a load flow in the load circuit are provided. The sensor device for detecting the entry-side load temperature can be a temperature probe at the entry side of the load circuit. The sensor device for detecting a load flow can be a flowmeter arranged in the load circuit. Alternatively, the load flow, as described above, can also be detected via a pump in the load circuit and producing the load flow. Moreover, a temperature detection device for detecting an exit side load temperature and/or a temperature detection device for detecting an entry-side supply temperature is further preferably present in the heat transfer system. For this, temperature sensors can likewise be provided, which deliver the exit-side load temperature and/or the entry-side supply temperature as input variables for the setting of the supply flow according to the invention and according to the method which is described above and which is implemented in the control device of a heat transfer device according to the invention.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
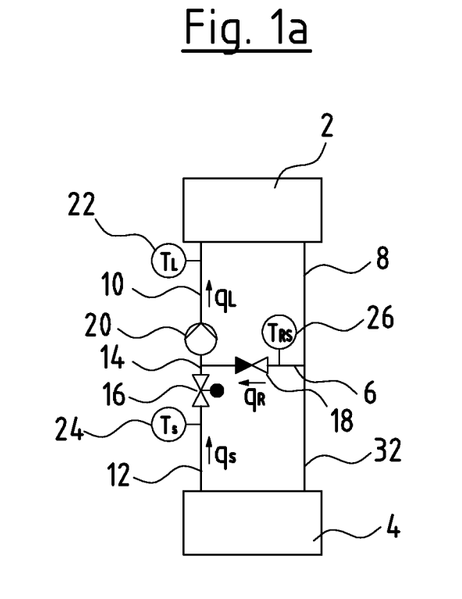
FIG. 1*a* is a schematic view showing a heat transfer system according to the invention, with a mixing circuit.

Referring to the drawings, the heat transfer system shown in FIG. 1a comprises a load circuit 2 as well as a supply or a supply circuit 4. A heat transfer device in the form of a mixing circuit with a mixing conduit 6 is arranged between the supply 4 and the load circuit 2. The mixing conduit 6 connects an outlet 8 to the entry 10 of the load circuit 2. The entry 10 is simultaneously connected to a supply conduit 12 coming from the supply 4. The supply conduit 12 and the mixing conduit 6 meet in a mixing point 14. Thus the fluid flow from the supply conduit and the fluid flow from the mixing conduit 6 are mixed in this mixing point 14 and together get to the entry 10 of the load circuit 2. A valve 16 is arranged in the supply conduit 12 and is settable in its degree of opening, i.e. in particular can be designed as a motorically driven proportional valve, in order to be able to set the mixing ratio of the supply flow $q_S$ in the supply conduit 12 and of the mixing flow $q_R$ in the mixing conduit 6. A check valve 18 is arranged in the mixing conduit 6. The sums of the flows of the supply flow $q_S$ and of the mixing flow $q_R$ forms the load flow $q_L$ in the load circuit 2. This load flow $q_L$ is also produced by a load pump 20. Additionally, three temperature sensors 22, 24 and 26 are arranged in the shown system, of which the temperature sensor 22 detects the entry-side load temperature $T_L$ which the fluid has at the entry 10 of the load circuit 2, and the temperature sensor 24 detects the supply temperature $T_S$ in the supply conduit 12. The supply temperature $T_S$ is the temperature of the fluid which flows through the supply conduit 12. The third temperature sensor 26 in the mixing conduit 6 detects the temperature of the fluid exiting from the load circuit 2, i.e. the exit side load temperature $T_{RS}$.

Figure 1B:
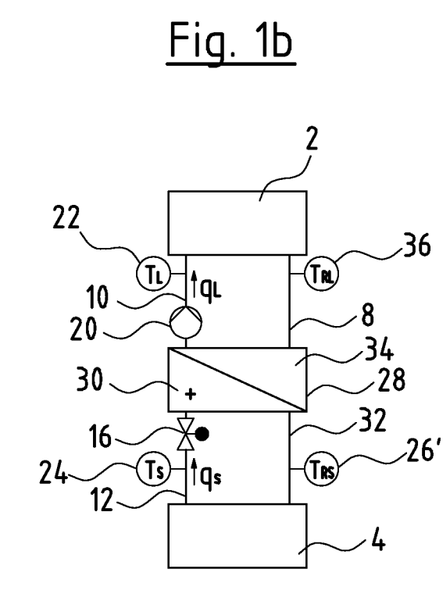
FIG. 1b is a schematic view showing a heat transfer system according to the invention, with a heat exchanger.

FIG. 1b shows a second variant of the heat transfer system according to the invention, wherein the same components are indicated with the same reference numerals as in FIG. 1a. In contrast to the embodiment example according to FIG. 1a, the heat transfer system according to FIG. 1b does not have a mixing device as a heat transfer device, but a heat exchanger 28. The fluid of the supply circuit or of the supply 4 flows through a first flow path 30 of the heat exchanger 28. Thereby, the supply flow $q_S$ i.e. the flow through the supply circuit, is set via the valve 16 which can be designed in the previously described manner. The supply temperature $T_S$ in the feed flow to the heat exchanger 28 is detected via the temperature sensor 24. The exit-side supply temperature $T_{RS}$ is detected via the temperature sensor 26'. In the embodiment example according to FIG. 1a, the exit-side load temperature which is detected by the temperature sensor 26 likewise corresponds to the exit-side supply temperature $T_{RS}$, since the same temperature prevails in the return 32 of the supply circuit.

The heat exchanger 28 in the embodiment example according to FIG. 1b comprises a second flow path 34, through which the fluid of the load circuit 2 flows. The fluid thereby is delivered by the load pump 20. In the example shown here, a further temperature sensor 36 detecting the temperature of the fluid in the outlet 8, i.e. the exit-side load temperature $T_{RL}$, is arranged in the outlet 8 of the load circuit 2. The fluid flows via the outlet 8 into the first flow path of the heat exchanger 34 and from there the fluid is heated in the supply circuit 4 and then flows through the entry 10 back into the load circuit 2.

For both previously described variants of a heat transfer system, according to the invention, a new type of control method is applied, with which the supply flow $q_S$ in the supply conduit 12 is set on the basis of the desired entry-side load temperature $T_{ref}$ of an actual entry-side load temperature $T_L$ which is detected in the load circuit 2 or in its entry 10 by the temperature sensor 22, as well as of the load flow $q_L$. The load flow $q_L$ in this example is detected via the load pump. With this, it is the case of a pump assembly which can detect or determine the delivery flow and issue it to a control device for further processing.

The following equilibrium equation for the temperatures and delivery flows results for the arrangement according to FIG. 1a:

$$T_L = T_{RS} + \frac{q_S}{q_L}(T_S - T_{RS})$$

The corresponding following equilibrium equation results for the arrangement according to FIG. 1b:

$$T_L = T_{RL} + \frac{q_S}{q_L}(T_S - T_{RS})$$

The delivery flow can be determined as follows from these equilibrium equations:

$$q_S = \frac{q_L}{T_S - T_{RS}} \cdot V$$

Wherein V can be a control signal or likewise be computed from the measured temperature values in the subsequent manner. If, in the equilibrium equations mentioned above, the temperature $T_L$, i.e. the entry-side load temperature is replaced by the desired load temperature, i.e. the target value or reference value for the load temperature $T_{ref}$, then for the embodiment example according to FIG. 1a it results:

$$V = T_{ref} - T_{RS}$$

and for the embodiment example in FIG. 1b:

$$V = T_{ref} - T_{RL}$$

In order hereinafter to be able to describe both embodiment examples together, the temperature variable $T_R$ is introduced, which in the case of the use of a mixing circuit corresponds to the temperature $T_{RS}$ which is the exit-side load temperature and simultaneously the temperature in the return 32 of the supply circuit 4. In the case that a heat exchanger is used, $T_R$ corresponds to the exit-side load temperature $T_{RL}$ at the exit 8 of the load circuit 2.

$(T_{ref} - T_R)$ forms a feedforward factor for a feedforward regulation or control. The term forms the inverse amplification factor of the mixing circuit or of the heat exchanger. According to the equation mentioned above, the supply flow $q_S$ can be set in dependence on the load flow $q_L$ and on the detected temperatures or defined temperatures on the basis of these factors, so that as a whole a more accurate, quicker regulation which is less prone to oscillation can be achieved.

Figure 2:
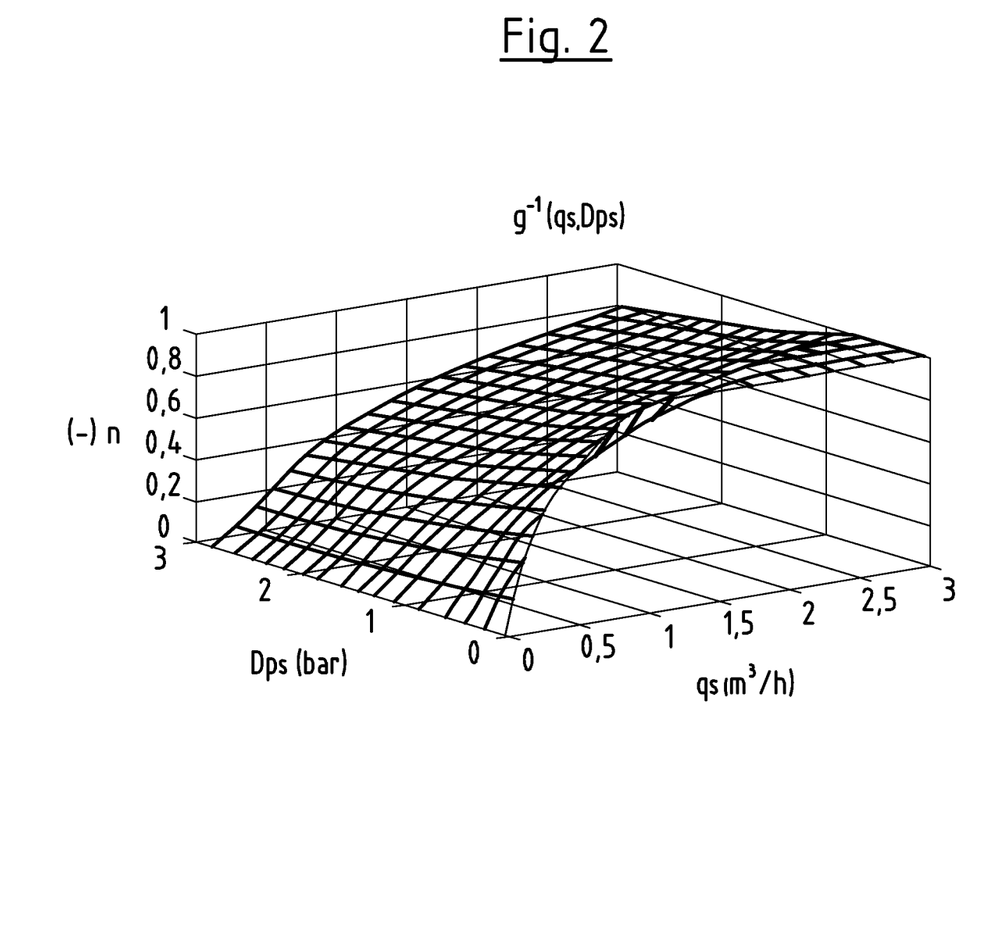
FIG. 2 is a schematic view showing a characteristic field which represents the relationship between a signal proportional to the valve opening and the differential pressure across the valve as well as the flow.

FIG. 2 schematically shows an example of the control or regulation amid the use of a valve 16 in the supply conduit 12. The feedforward factor in the feedforward evaluation 38 is formed by way of subtraction of the temperature value $T_R$ ($T_{RS}$ or $T_{RL}$, depending on whether it is the case of a heat exchanger or mixer) from the desired entry-side load temperature $T_{ref}$. In amplification factor evaluation 40, the temperature value $T_{RS}$ which is determined by the temperature sensor 26 or 26' in the return 32 of the supply 4, is subtracted from the supply temperature $T_S$ which is detected in the supply conduit 12 by the temperature sensor 24. Subsequently, the load flow $q_L$ which is issued by the load pump 20 is divided in the divider 44 by output signal of the subtractor 42. The thus produced signal is subsequently multiplied by the feedforward factor in the multiplier 46, which results in the desired load flow $q_S$.

If now a valve 16 for setting the load flow $q_S$ is provided in the supply conduit 12, a signal U proportional to the valve opening, is determined for example on the basis of the characteristic field shown in FIG. 2, in the case that it is the case of a non-linear valve, wherein in the evaluation:

the differential pressure $Dp_S$ across the valve is incorporated. This differential pressure can be determined as is explained later by way of FIG. 7.

Figure 3:
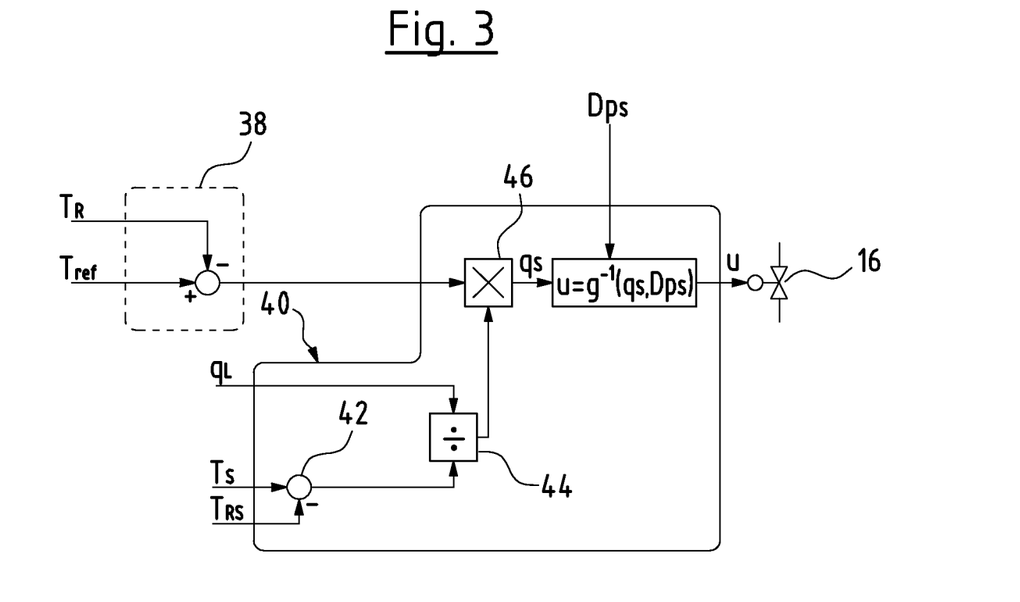
FIG. 3 is a schematic view showing the control of a valve for setting the supply flow according to a first embodiment of the invention.
Figure 4:
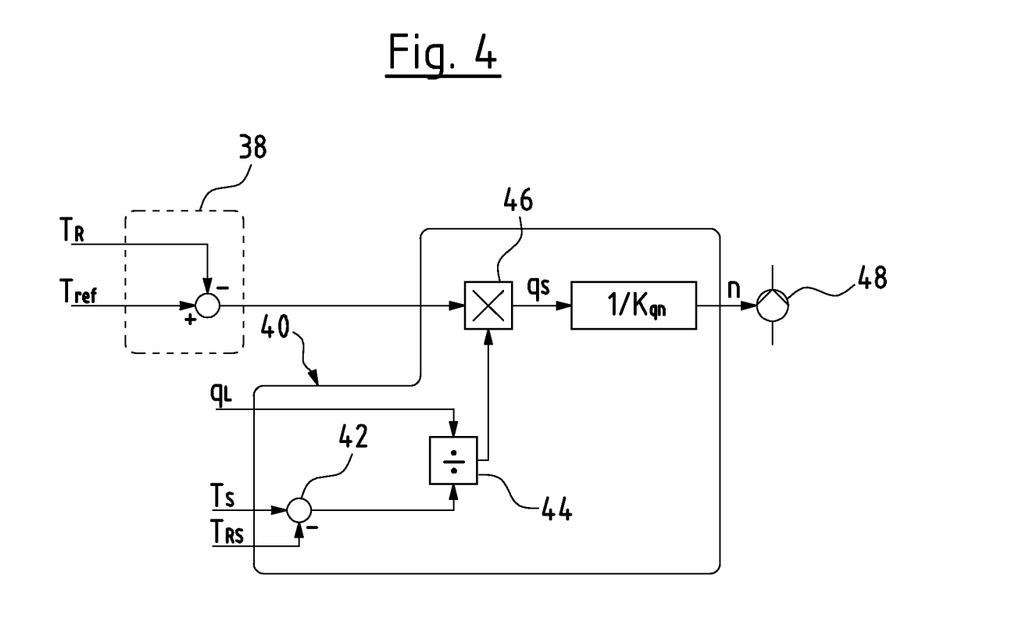
FIG. 4 is a schematic view showing a speed control of a pump for setting a supply flow according to a further embodiment of the invention.

FIG. 4 shows the control according to FIG. 3, for the case that a pump 48 i.e. a supply pump 48 is applied instead of a valve 16 in the supply conduit 12. For this, the desired speed n must be determined on the basis of the desired supply flow $q_S$. This is effected according to the equation $$n = \frac{q_S}{K_{qn}}$$

wherein $K_{qn}$ is a time-dependent signal which depends on the flow resistance in the supply circuit 4 or the supply 4.

Figure 5:
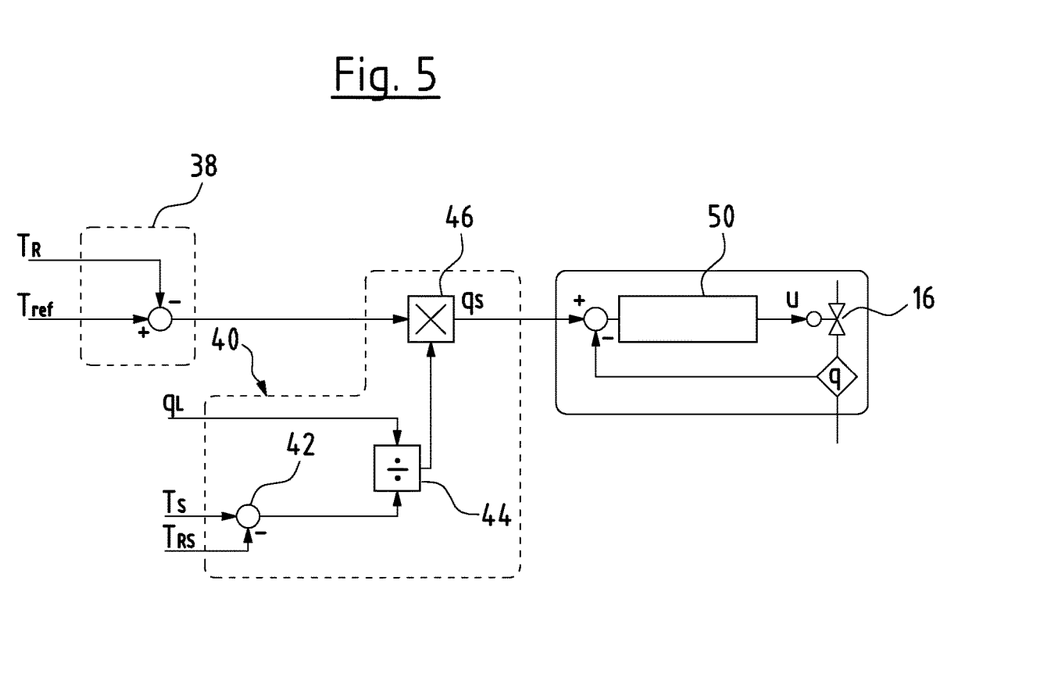
FIG. 5 is a schematic view showing the regulation of the supply flow with the help of a separate flow regulator.

FIG. 5 shows a further variant of the control shown in FIG. 3, with which the evaluated supply flow $q_S$ is transferred to a subsequent flow regulator 50 which regulates the supply flow $q_S$ by way of setting the valve 16. Additionally, the detection of the supply flow $q_S$ in the supply conduit 12 or at another location of the supply 4, for example in the return 32, is necessary for such a flow regulation. It is to be understood that such a flow regulation could also be effected amid the use of a pump 48 in a suitable manner, wherein the flow regulator 50 would then not regulate the control signal U for the valve 16, but the speed n for the pump 48.

Figure 6:
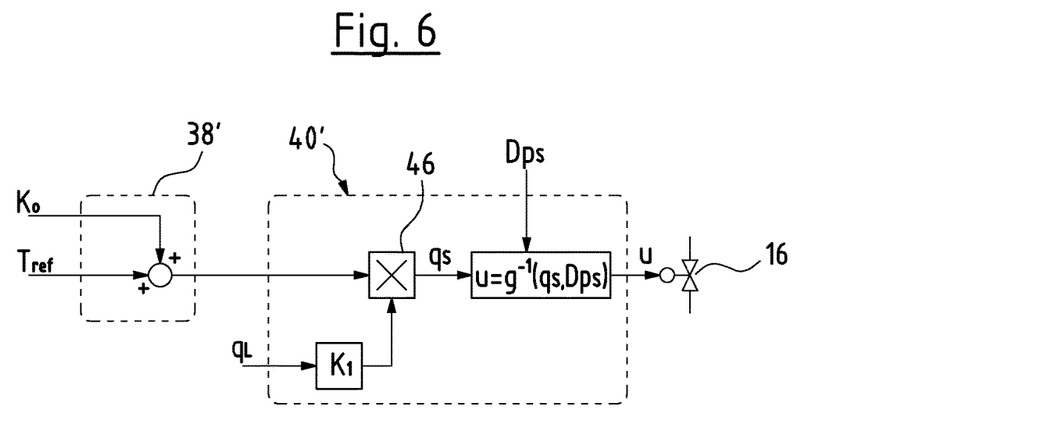
FIG. 6 is a schematic view showing a simplified control of a valve for setting the supply flow.

FIG. 6 shows a further variant of the control which has a simplified construction. With this variant, the evaluation of the feedforward factor in the feedforward evaluation 38' is not effected by way of subtraction of an actually measured temperature signal $T_R$ from the desired entry-side load temperature $T_{ref}$. In contrast, here the desire entry-side load temperature $T_{ref}$ is added to a constant $K_0$. Accordingly, the load flow $q_L$ is only multiplied by a constant $K_1$. The constants $K_0$ and $K_1$ are constants which are dependent on the installation. These signals are then multiplied in the multiplier, in order to determine the supply flow $q_S$. On the basis of this flow, a control signal U for the valve 16 is subsequently determined, as in the example according to FIG. 3 amid the use of a characteristic field in FIG. 2 and whilst taking into account the differential pressure $Dp_S$. The use of constants $K_0$ and $K_1$ instead of actually measured temperatures permits a simplified feedforward regulation.

With regard to the evaluation of the control signal U for the valve 16 from a characteristic field as is shown in FIG. 1b, it is to be understood that instead of the measurement of the differential pressure $Dp_S$ in systems, in which only lower pressure fluctuations prevail, a fixed factor can also be used. For the case that it is the case of a linear valve, moreover one can make do without the characteristic field and instead of this the control signal U for the valve 16 can be derived from the delivery flow $q_S$ via an analytic function.

FIGS. 7a-7f show variants of the heat transfer system according to FIG. 1a, with the necessary signal flows to a control device which controls a valve or supply valve 16, 16' or a supply pump 48.

Figure 7A:
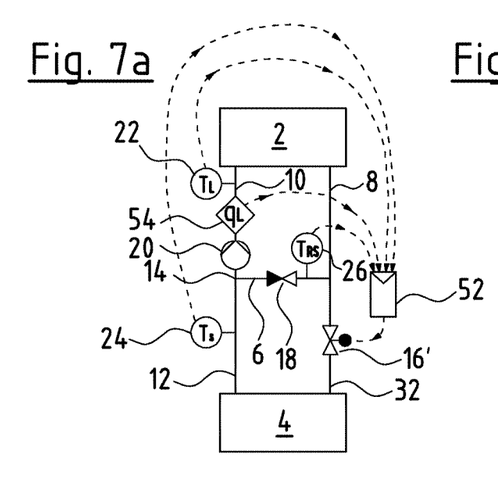
FIG. 7a is a schematic view showing one of six different heat transfer systems according to the invention with mixing circuits and different sensor and actuator elements.

The variant in FIG. 7a differs from the variant in FIG. 1a by way of the fact that the supply valve or valve 16' is not situated in the supply conduit 12 but in the return 32 of the supply 4. However, the same flow prevails in the return 32 as in the supply conduit 12, so that the valve 16, 16' can be selectively arranged in the supply conduit 12 or in the return 32, i.e. the flow in the supply conduit 12 can also be set via the valve 16' in the return 32. The entry-side load temperature $T_L$ is detected via the temperature sensor 22, the supply temperature $T_S$ via the temperature sensor 24 and the exit-side load temperature which corresponds to the exit-side supply temperature $T_{RS}$ via the temperature sensor 26 in the mixing conduit 6, and their signals are led to the control device 52. Moreover, in this embodiment example, a flowmeter 54 for determining the load flow $q_L$ is arranged in the load circuit 2, in this example in the entry 10. Alternatively, the load flow $q_L$ can be determined directly via the load pump 20, as has been described above. The determined load flow $q_L$ or a signal proportional to this is led to the control device 52. A control method as has been previously described, takes its course in the control device 52, in order to open or close the supply valve 16' in the desired manner or to set the degree of opening of the valve 16'. If the arrangement is selected as is shown in FIG. 1*a*, with the valve 16 in the forward feed of the supply circuit 4, this valve 16 can be linked in a suitable manner to the mentioned sensors and be controlled by the control device 52.

Figure 7B:
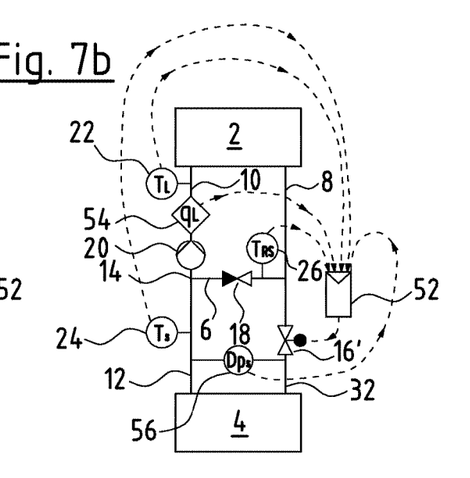
FIG. 7b is a schematic view showing another of six different heat transfer systems according to the invention with mixing circuits and different sensor and actuator elements.

The embodiment variant according to FIG. 7*b* differs from the previously described arrangement in FIG. 7*a* b way of the fact that additionally a differential pressure $Dp_S$ in the supply circuit 4 between the feed i.e. the supply conduit 12 and the return 32 is determined. This differential pressure $Dp_S$ is likewise led to the control device 52 and is taken into account by this on determining the control signal U for the valve 16', for example on the basis of a characteristic field, as is shown in FIG. 2, in the manner described above.

Figure 7C:
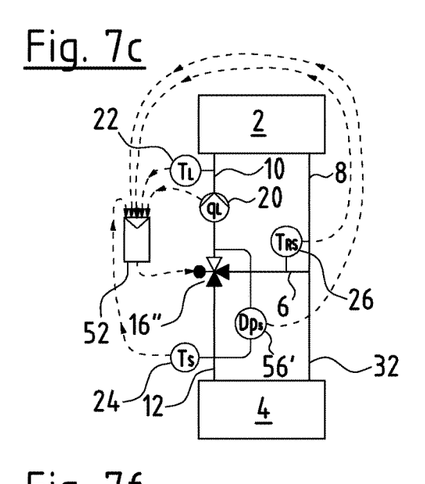
FIG. 7c is a schematic view showing another of six different heat transfer systems according to the invention with mixing circuits and different sensor and actuator elements.

FIG. 7*c* shows a further variant, with which the valve 16" serving as a supply valve is arranged as a mixing valve in the mixing point 14. I.e. it is the case of a 3/2-way valve, via which the mixing of the delivery flows from the mixing conduit 6 and the supply conduit 12 is effected in the desired manner. Thereby, the valve 16" is preferable motorically driven and is controlled or regulated via the control device 52 in the manner described above. This mixing valve 16" also serves for setting the supply flow $q_S$, since with a reduction of the mixing flow through the mixing conduit 6, the supply flow $q_S$ through the supply conduit 12 is simultaneously increased and vice versa. With the embodiment example in FIG. 7*c*, in contrast to the embodiment examples according to FIGS. 7*a* and *b*, again as also in the embodiment example according to FIG. 1*a*, the load flow $q_L$ is determined or detected directly by the load pump 20 and led to the control device 52. Moreover, the differential pressure $Dp_S$ across the valve 16" between the supply conduit 12 and the entry 10 of the load circuit 2 is detected via a differential pressure sensor 56'. The differential pressure $Dp_S$ is used in the manner described above, in order to determine the control signal U for the valve 16".

Figure 7D:
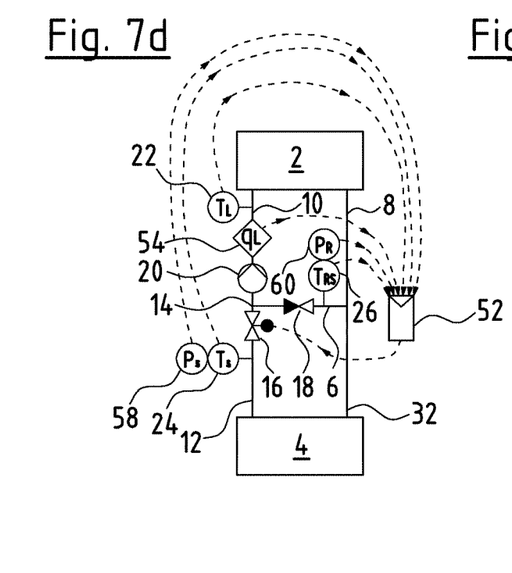
FIG. 7d is a schematic view showing another of six different heat transfer systems according to the invention with mixing circuits and different sensor and actuator elements.

The construction shown in FIG. 7*d* corresponds to that shown in FIG. 1*a*, with the difference that here a flow sensor 54 for detecting the load flow $q_L$ is present. Additionally, two pressure sensors 58 and 60 are present, wherein the pressure sensor 58 is arranged on the supply conduit 12 and detects the supply pressure $P_S$, and the pressure sensor 60 is arranged in the mixing conduit 6 and detects the exit-side load pressure $P_R$ which is the same as the exit-side pressure in the return 32 of the supply 4. The pressure sensor 58 can be integrated with the temperature sensor 24 into a sensor. Accordingly, the temperature sensor 24 can be integrated with the pressure sensor 60 into a sensor. Again, a differential pressure $Dp_S$ can be formed in the control device 52 from the pressure signals for the supply pressure $P_S$ and the exit-side load pressure $P_R$ and this differential pressure can form the basis of the evaluation of the control value U for the valve 16.

Figure 7E:
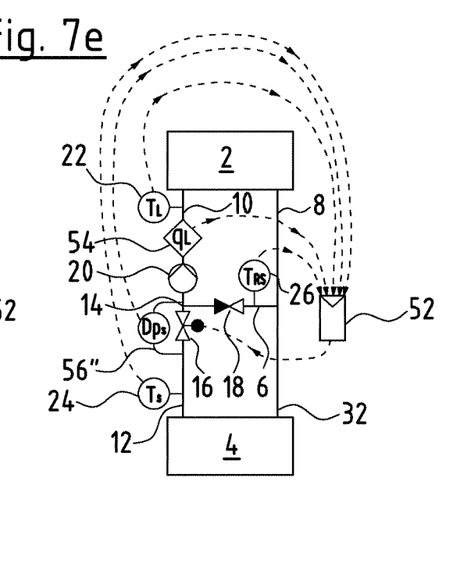
FIG. 7e is a schematic view showing another of six different heat transfer systems according to the invention with mixing circuits and different sensor and actuator elements.

In the variant of the heat transfer system according to FIG. 7*e*, in contrast to the embodiment according to FIG. 7*d*, a differential pressure sensor 56" is provided, which directly detects the differential pressure between the entry side and exit side of the valve 16 and leads this differential pressure $Dp_S$ to the control device 52, wherein this control device as described takes this pressure difference into account for determining the control signal U for the valve 16.

Figure 7F:
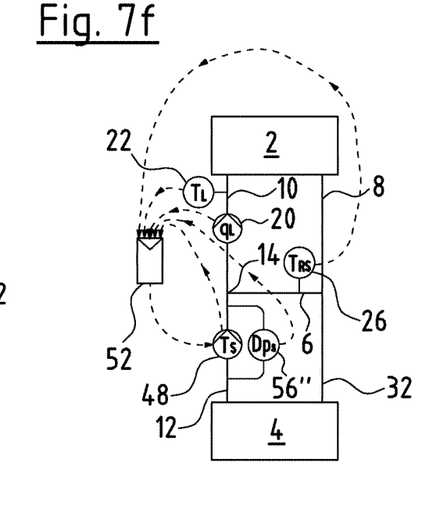
FIG. 7f is a schematic view showing another of six different heat transfer systems according to the invention with mixing circuits and different sensor and actuator elements.

The embodiment according to FIG. 7*f* differs from the embodiment according to FIG. 7*e* in that a supply pump 48 setting the supply flow $q_S$ is arranged in the supply conduit 12 instead of a valve 16. The supply pump 48 simultaneously serves a as temperature sensor for detecting the supply temperature $T_S$ and issues this supply temperature $T_S$ to the control device 52. Moreover, with this embodiment example, one makes do without the check valve 18 and also without the flowmeter 54. Instead, the load flow $q_L$ again is here determined by the load pump 20 and issued to the control device 52. The control device 52 in the manner described above determines the necessary speed n for the supply pump 48 on the basis of the determined variables as well as the desired entry-side load temperature $T_{ref}$.

The previously described feedforward control has the advantage that a more rapid regulation can be effected since a more rapid adaptation of the load flow $q_L$ is possible, in order to bring the entry-side load temperature $T_L$ as quickly as possible to the desired entry-side load temperature $T_{ref}$.

Figure 8:
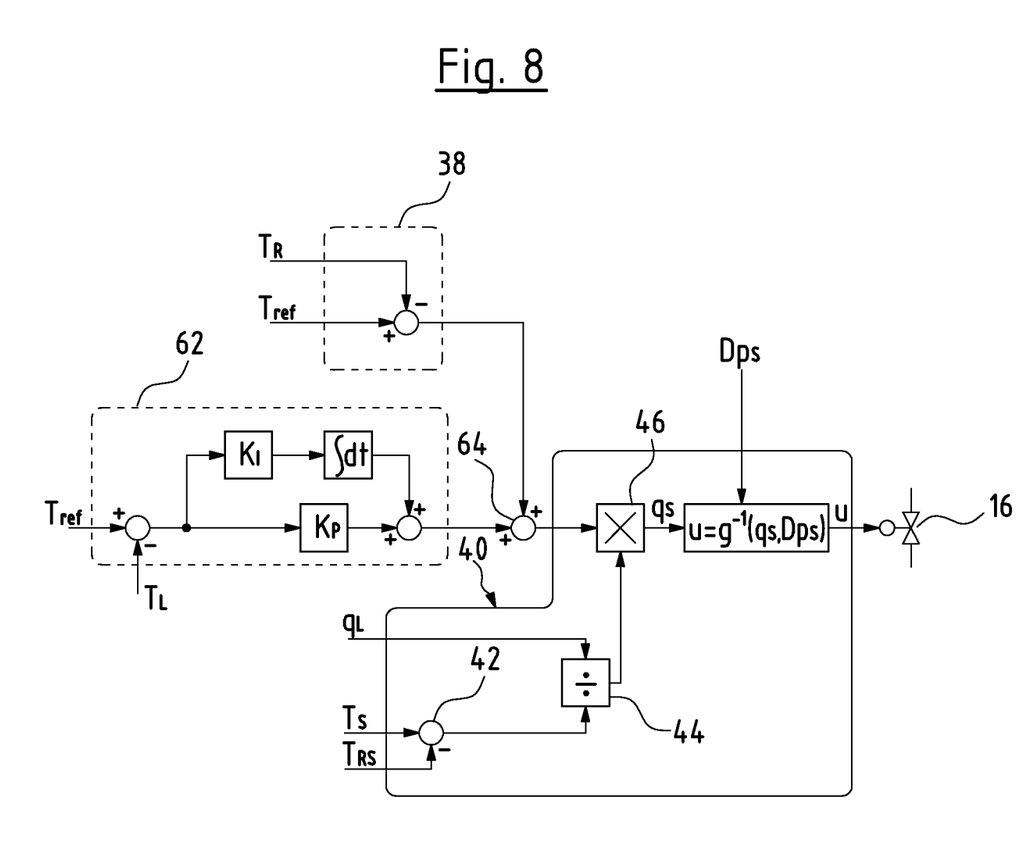
FIG. 8 is a schematic view showing the control of a valve for setting the supply flow amid the use of a regulation of the entry-side load temperature.

Additionally to this feedforward control, which was described schematically by way of FIG. 3, as is shown in FIG. 8, an additional feedback control for the entry-side load temperature $T_L$ can be provided. As is shown in FIG. 8, an additional feedback regulator is provided for this, to which the desired entry-side load temperature $T_{RS}$ as well as the actual entry-side load temperature $T_L$ are led as input variables. The output signal of this feedback regulator or controller 62 is added in the adder 64 to the output signal of the feed-forward evaluation 38 and then led to the multiplier 46, via which the desired supply flow $q_S$ is then determined in the manner described above. A valve 16 for the regulation of the supply flow $q_S$ is also used in this example. It is to be understood that the use of a feedback regulator 62 could however also be accordingly applied with a supply pump 48 in a manner complementing the control shown in FIG. 4.

Figure 9:
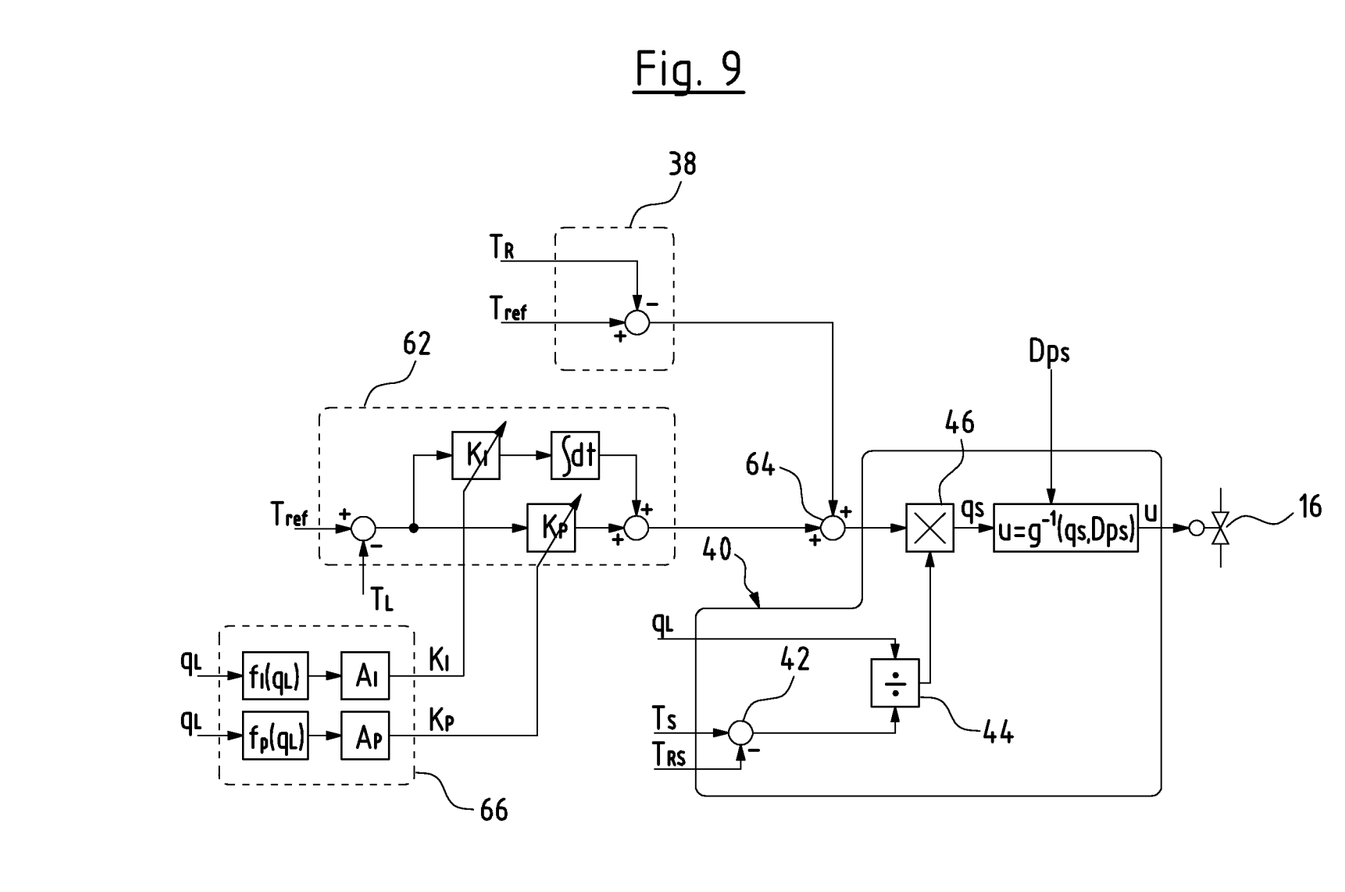
FIG. 9 is a schematic view showing a control according to FIG. 8 with a compensation of the occurring temperature delay.

Moreover, the problem of delays occurring in the regulation can arise due to a spatial distance between the point at which the returning fluid and the fluid form the supply conduit are mixed, i.e. the mixing point 14 and the point at which the entry-side load temperature $T_L$ is determined via the temperature sensor 22. Accordingly, with the use of a heat exchanger, the distance between the heat exchanger 28 and the temperature sensor 22 can be very large. A transport delay in the regulation occurs on account of this. Additional correction factors can be applied in order to compensate this. Moreover, this transport delay is however also dependent on the load flow $q_L$, i.e. with a high load flow $q_L$ the fluid mixed at the mixing point 14 or heated in the heat exchanger 28 reaches the temperature sensor 22 more rapidly than with a low delivery flow $q_L$. As is shown in FIG. 9, an adaptation device 66 can be applied for this, as a supplement to the control or regulation shown in FIG. 8. Amid the application of two scaling factors $A_I$ and $A_P$ as well as two functions $f_I$ and $f_P$, a proportional amplification factor $K_P$ as well as an integral amplification factor $K_I$ which are led to the feedback regulator 62 can be formed in the adaptation device 66 on the basis of the detected load flow $q_L$. There, the amplification factors $K_I$ and $K_P$ form amplification factors of a PI-regulator which is used there, by which means the transport delay is compensated.

Figure 10:
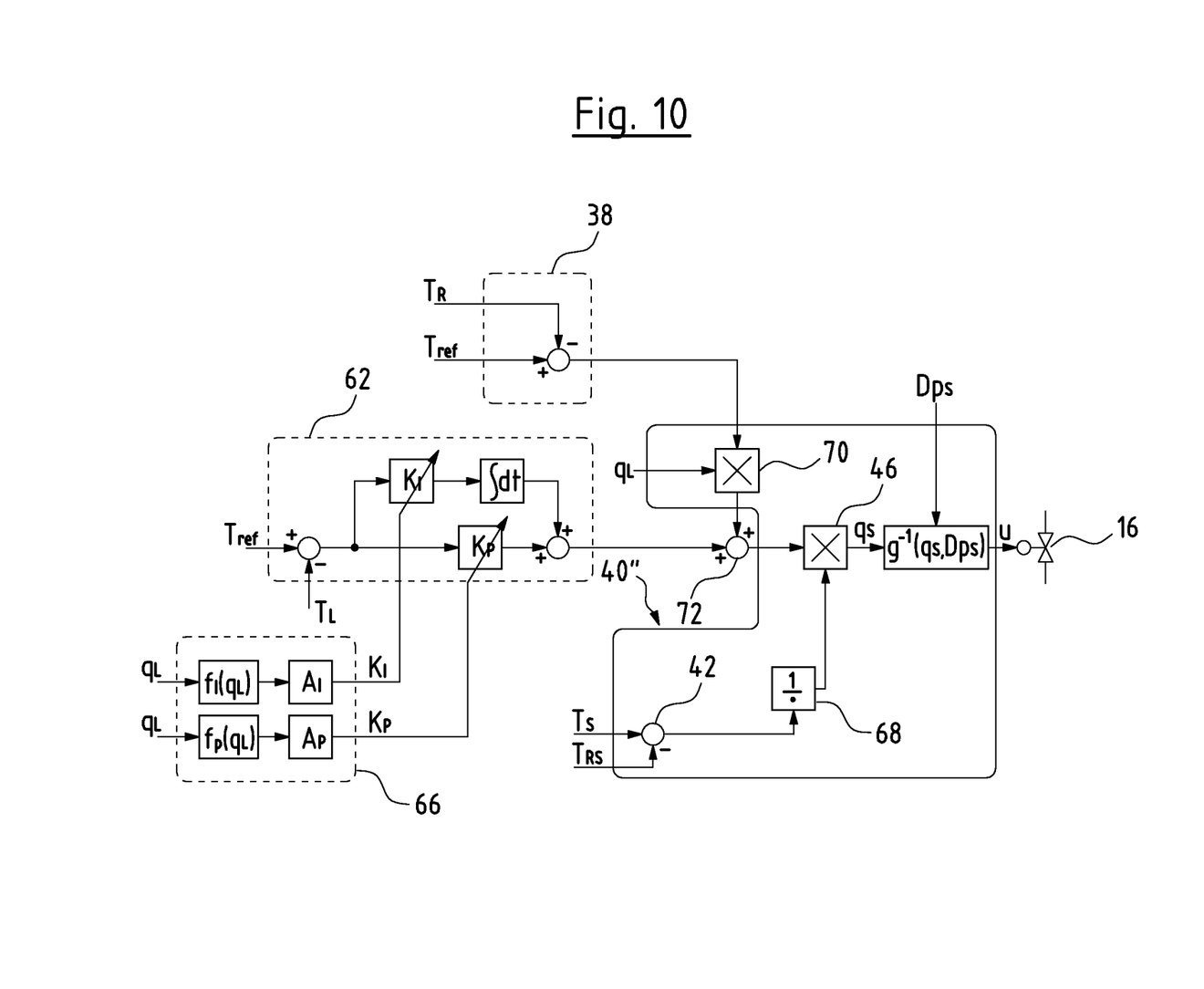
FIG. 10 is a schematic view showing a variant of the control according to FIG. 9.

FIG. 10 shows a variant of the control according to FIG. 9. The adaptation device 66 and the feedback regulator 62 as well as the feedforward evaluation 38 correspond to the preceding description, but the amplification factor evaluation 40" is constructed somewhat differently. The output signal of the subtractor 42 is led to an inverter 68. The load flow $q_L$ is multiplied in a multiplier 70 directly by the output signal of the feedforward evaluation 38 and then led to the adder 72 for the addition to the output signal of the feedback regulator 62. The output signal of the adder 72 is led to the multiplier 46 where it is multiplied by the output signal of the inverter 68 for determining the desired supply flow $q_S$. The evaluation of the control variable U for the valve 16 is then effected in the manner described above.

Figure 11:
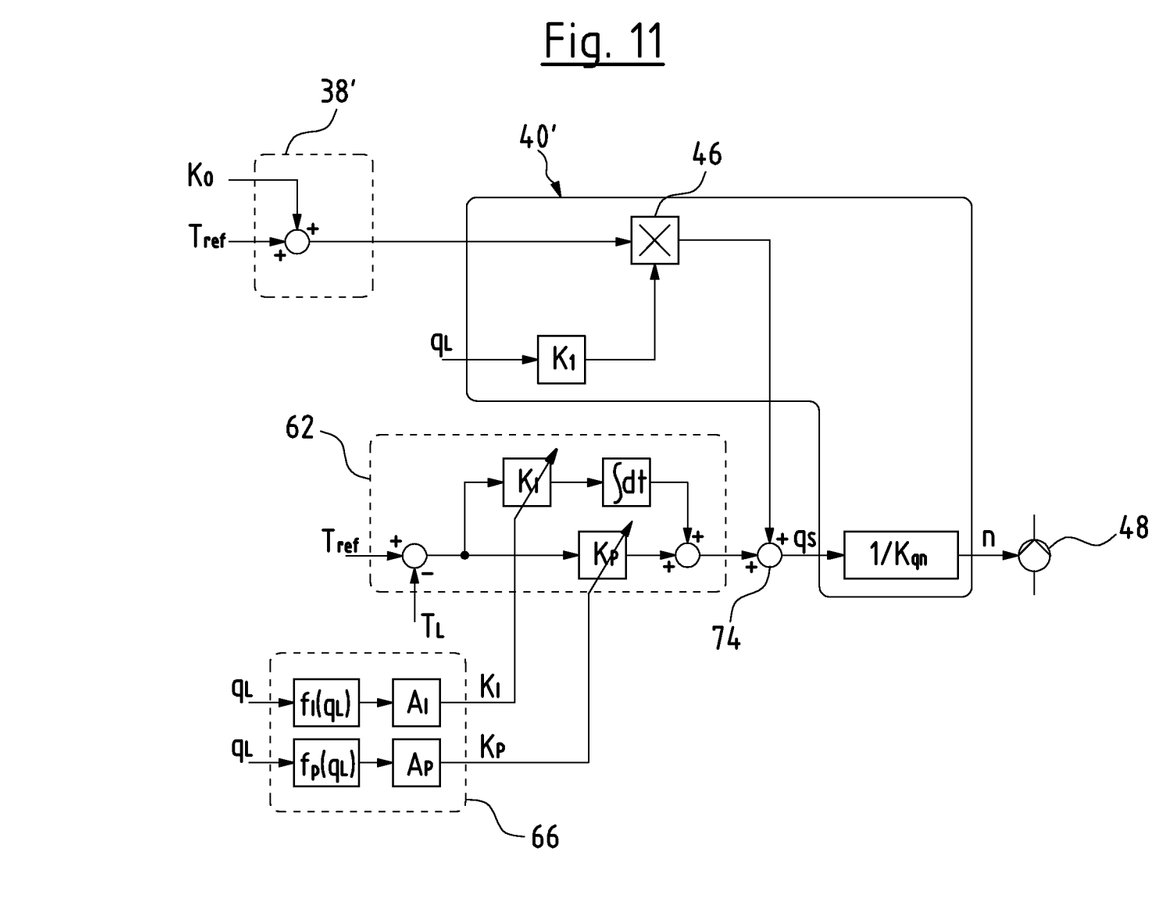
FIG. 11 is a schematic view showing a simplified variant of the control according to FIG. 10.

FIG. 11 shows a variant of the control according to FIG. 6 amid the use of a feedback regulator 62 and an adaptation device 66, as has been described previously. With this, the output signal of the multiplier 46, as has been described by way of FIG. 6, is added to the output signal of the feedback regulator 62 in an adder 64. Subsequently, in contrast to the embodiment example according to FIG. 6, as has been described by way of FIG. 4, the speed n for a supply pump 48 is determined on the basis of the desired supply flow $q_S$ determined at the adder 64.

It is to be understood that if, in the preceding embodiment examples, certain functions have been described in the context of a supply pump 48, this can also be realized in a corresponding manner also with a supply valve 16. Accordingly, functions which have only been described in the context of the supply valve 16 can also be realized in a corresponding manner with a supply pump 48. A difference merely lies in the evaluation of the speed n as well as the control variable U on the basis of the determined supply flow $q_S$.

Moreover, it is to be understood that all control and regulation steps as have been described beforehand, preferably take place in the shown control device 52. This thus represents an electronic control device for the entire heat transfer system.

While specific embodiments of the invention have been shown and described in detail to illustrate the application of the principles of the invention, it will be understood that the invention may be embodied otherwise without departing from such principles.

APPENDIX

List of Reference Numerals 2 load circuit
4 supply
6 mixing conduit
8 outlet
10 entry
12 supply conduit
14 mixing point
16, 16', 16" valve or supply valve
18 check valve
20 load pump
22, 24, 26, 26' temperature sensors
28 heat exchanger
30 first flow path
32 return
34 second flow path
36 temperature sensor
38, 38' feedforward evaluation
40, 40, 40' amplification factor evaluation
42 subtractor
44 divider
46 multiplier
48 supply pump
50 flow regulator
52 control device
54 flowmeter
56, 56', 56" differential pressure sensor
58, 60 pressure sensors
62 feedback regulator
64 adder
66 adaptation device
68 inverter
70 multiplier
72 adder
74 adder
$T_{RS}$ desired entry-side load temperature
$T_L$ entry-side load temperature
$T_{RL}$ exit-side load temperature
$T_S$ supply temperature
$T_{RS}$ exit-side temperature of the supply circuit
$T_R$ exit temperature, corresponds to $T_{RS}$ with the mixer and $T_{RL}$ with the heat exchanger
$q_L$ load flow
$q_S$ supply flow
$Dp_S$ differential pressure
n speed
U control variable
$K_P$, $K_I$ constants
$A_I$, $A_P$ scaling factor
$K_{qn}$ signal dependent on the flow resistance

What is claimed is:

1. A control method comprising:
providing a heat transfer system comprising a supply conduit, at least one load circuit and a heat transfer device arranged in a flow direction between the supply conduit and the at least one load circuit;
setting a desired supply flow in the supply conduit on the basis of:
a desired entry-side load temperature;
an actual entry-side load temperature which is detected in the load circuit; and
a load flow in the load circuit, wherein one of heat is transferred from the supply conduit to the load circuit and the load circuit is cooled via the supply conduit, the load circuit comprising at least one of a cooling circuit and a heating circuit for at least one of cooling and heating one of an object and a building, the at least one of the cooling circuit and the heating circuit defining one of a closed circuit and a closed conduit for fluid flow in the one of the closed circuit and the closed conduit, wherein one of a valve opening degree and a speed of a pump is determined in a next step based on the desired supply flow.

2. A control method according to claim 1, wherein the supply flow is controlled based at least a position of the valve, wherein heat from the supply circuit is transferred to the load circuit via the heat transfer device.

3. A control method according to claim 1, wherein the heat transfer device comprises at least one heat exchanger with a first flow path which is connected to the supply conduit and with a second flow path which is connected to the at least one load circuit.

4. A control method according to claim 1, wherein the heat transfer device comprises at least one mixing conduit which connects an outlet of the at least one load circuit and an entry of the load circuit to one another.

5. A control method according to claim 1, wherein the supply flow is set additionally on the basis of at least one of:
an exit-side load temperature; and
an entry-side supply temperature.

6. A control method according to claim 1, wherein the supply flow is set additionally on the basis of at least one of:
at least one constant linked to the load flow; and
a desired entry-side load temperature.

7. A control method according to claim 1, wherein the load flow is determined according to the following equation:

$$q_S = \frac{q_L}{T_S - T_{RS}} \cdot V$$

wherein:
$q_S$ is the supply flow;
$q_L$ is the load flow;
$T_S$ is the entry-side supply temperature;
$T_{RS}$ is the exit-side supply temperature; and
V is a control signal.

8. A control method according to claim 7, wherein the control signal V is the output signal of a regulator or is determined according to the equation:

$$V = T_{ref} - T_{RS}$$

or by combination of this equation with the output signal of a controller,
wherein:
$T_{ref}$ is the desired entry-side load temperature; and
$T_{RS}$ is the exit-side load temperature.

9. A control method according to claim 1, wherein the supply flow is set by a pump and a speed n of the pump is determined on the basis of the following equation:

$$n = \frac{q_S}{K_{qn}}$$

wherein:
$q_S$ is the supply flow; and
$K_{qn}$ is a time-dependent signal which is dependent on the flow resistance in the supply conduit.

10. A control method according to claim 2, wherein for determining a speed (n) of the pump or for determining an opening of the valve, a differential pressure across the pump or across the valve is taken into account.

11. A control method according to claim 1, wherein a transfer delay between a measurement point of the entry-side load temperature and the heat transfer device is taken into account by way of at least one constant and/or a function dependent on the load flow, on setting the supply flow.

12. A control method according to claim 1, wherein the load flow in the load circuit is determined via a load pump.

13. A heat transfer system comprising:
a supply conduit;
at least one load circuit, the load circuit comprising at least one of a closed loop cooling circuit and a closed loop heating circuit for at least one of cooling and heating one of an object and a building, the at least one of the closed loop cooling circuit and the closed loop heating circuit comprising one of a closed circuit and a closed conduit for fluid flow in the one of the closed circuit and the closed conduit, wherein one of heat is transferred from the supply conduit to the load circuit and the load circuit is cooled via the supply conduit;
a heat transfer device arranged in a flow direction between the supply conduit and the at least one load circuit; and
a supply flow setting device which sets a desired supply flow, wherein the supply flow setting device comprises at least one control device configured to carry out a control method comprising:
setting the desired supply flow in the supply conduit on the basis of:
a desired entry-side load temperature;
an actual entry-side load temperature which is detected in the load circuit; and
a load flow in the load circuit, wherein a flow regulator regulates the supply flow by setting a valve, wherein one of a valve opening degree and a speed of a pump is determined in a next step based on the desired supply flow.

14. A heat transfer system according to claim 13, wherein heat from the supply circuit is transferred to the at least one load circuit via the heat transfer device, the heat transfer system further comprising:
a sensor device detecting an entry-side load temperature of the load circuit;
a sensor device detecting a load flow in the load circuit; and
a temperature detection device for detecting at least one of an exit-side load temperature and an entry-side supply temperature.

15. A heat transfer system according to claim 13, wherein a degree of valve opening of the valve is set by the control device, wherein the supply flow is controlled based on a position of the valve.

16. A heat transfer system according to claim 13, wherein the heat transfer device comprises one of:
at least one heat exchanger which comprises a first flow path connected to the supply conduit and a second flow path connected to the at least one load circuit; and
a mixing conduit which connects the exit side of the at least one load circuit to the entry side of the load circuit.

17. A heat transfer system control method comprising the steps of:
providing a heat transfer system comprising a supply conduit, a flow regulator comprising a valve, at least one load circuit, a heat transfer device arranged in a flow direction between the supply conduit and the at least one load circuit and a supply flow setting device which sets a supply flow, wherein the supply flow setting device comprises at least one control device, the load circuit comprising at least one of a closed loop cooling circuit and a closed loop heating circuit for at least one of cooling and heating one of an object and a building, the at least one of the closed loop cooling circuit and the closed loop heating circuit comprising one of a closed circuit and a closed conduit for fluid flow in the one of the closed circuit and the closed conduit, wherein one of heat is transferred from the supply conduit to the load circuit and the load circuit is cooled via the supply conduit; and
setting the supply flow in the supply conduit with the at least one control device on the basis of:
a desired entry-side load temperature;
an actual entry-side load temperature which is detected in the load circuit; and
a load flow in the load circuit, wherein the flow regulator receives a set supply flow value as input, the flow regulator regulating the supply flow by controlling the valve based on the set supply flow value.

18. A control method according to claim 17, wherein heat from the supply circuit is transferred to the load circuit via the heat transfer device, wherein the supply flow is controlled based on one of a speed of the pump and a position of the valve.

19. A control method according to claim 17, wherein the heat transfer device comprises at least one heat exchanger with a first flow path which is connected to the supply conduit and with a second flow path which is connected to the at least one load circuit.

20. A control method according to claim 17, wherein the heat transfer device comprises at least one mixing conduit which connects an outlet of the at least one load circuit and an entry of the load circuit to one another.

\* \* \* \* \*